US007890758B2

(12) United States Patent
Dettinger et al.

(10) Patent No.: US 7,890,758 B2
(45) Date of Patent: Feb. 15, 2011

(54) APPARATUS AND METHOD FOR GENERATING KEYS IN A NETWORK COMPUTING ENVIRONMENT

(75) Inventors: Richard Dean Dettinger, Rochester, MN (US); Jennifer Lynn La Rocca, Rochester, MN (US); Richard Joseph Stevens, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 2340 days.

(21) Appl. No.: 10/401,261

(22) Filed: Mar. 27, 2003

(65) Prior Publication Data

US 2004/0190724 A1 Sep. 30, 2004

(51) Int. Cl.
*H04L 9/32* (2006.01)
*H04L 9/00* (2006.01)
*H04L 9/08* (2006.01)
*H04K 1/06* (2006.01)

(52) U.S. Cl. .................... 713/171; 380/37; 380/262; 380/268; 380/277; 380/279

(58) Field of Classification Search ................. 380/277, 380/37, 262, 268, 278; 713/171
See application file for complete search history.

(56) References Cited

U.S. PATENT DOCUMENTS

| | | | | |
|---|---|---|---|---|
| 5,737,419 A | * | 4/1998 | Ganesan ...................... | 713/169 |
| 5,748,734 A | * | 5/1998 | Mizikovsky ................ | 380/247 |
| 5,748,735 A | * | 5/1998 | Ganesan ...................... | 713/165 |
| 6,166,650 A | * | 12/2000 | Bruwer ....................... | 340/5.26 |
| 6,185,685 B1 | * | 2/2001 | Morgan et al. .............. | 713/183 |
| 6,233,341 B1 | * | 5/2001 | Riggins ....................... | 380/277 |
| 6,343,280 B2 | * | 1/2002 | Clark .......................... | 705/55 |
| 6,725,227 B1 | | 4/2004 | Li | |
| 6,816,970 B2 | * | 11/2004 | Morgan et al. .............. | 713/183 |
| 7,149,308 B1 | * | 12/2006 | Fruehauf et al. ............. | 380/44 |
| 7,209,560 B1 | * | 4/2007 | Fairman et al. ............. | 380/255 |
| 7,234,058 B1 | * | 6/2007 | Baugher et al. ............. | 713/163 |
| 2001/0011251 A1 | * | 8/2001 | Sugahara et al. ............. | 705/51 |
| 2002/0129261 A1 | * | 9/2002 | Cromer et al. .............. | 713/193 |

* cited by examiner

*Primary Examiner*—Nasser Moazzami
*Assistant Examiner*—Mohammad W Reza
(74) *Attorney, Agent, or Firm*—Martin & Associates, LLC; Bret J. Petersen

(57) ABSTRACT

A global key control mechanism provides a single point of overall control for key generation, but portions of the key generation and/or allocation tasks may be delegated to client computer systems, thereby reducing network traffic. The global key control mechanism may download a client key generation mechanism on one or more client computer systems, and may allocate a block of keys to the client key generation mechanism. Requests for keys may then be routed to the client key generation mechanism, which can generate and/or allocate keys within the block of keys that the global key control mechanism allocated to it. When the block of keys is used up, the client key generation mechanism may request another block from the global key control mechanism. The preferred embodiments also include the capability of downloading a client key generation mechanism with an associated block of keys once the requests from one or more client applications exceed a predetermined threshold. In addition, the preferred embodiments include a hierarchy of key control mechanisms, with a single global key control mechanism that maintains control over one or more client key control mechanisms that may, in turn, control other client key control mechanism(s) or which may generate and/or allocate keys directly to requesting applications.

23 Claims, 7 Drawing Sheets

APPARATUS AND METHOD FOR GENERATING KEYS IN A NETWORK COMPUTING ENVIRONMENT

BACKGROUND OF THE INVENTION

1. Technical Field

This invention generally relates to computer systems, and more specifically relates to apparatus and methods for generating keys in a computer network.

2. Background Art

Since the dawn of the computer age, computers have evolved and become more and more powerful. In our present day, computers have become indispensable in many fields of human endeavor including engineering design, machine and process control, information storage and retrieval, and office computing. One of the primary uses of computers is for information storage and retrieval.

Database systems have been developed that allow a computer to store a large amount of information in a way that allows a user to search for and retrieve specific information in the database. For example, an insurance company may have a database that includes all of its policy holders and their current account information, including payment history, premium amount, policy number, policy type, exclusions to coverage, etc. A database system allows the insurance company to retrieve the account information for a single policy holder among the thousands and perhaps millions of policy holders in its database.

One common requirement for databases is the need to generate keys. A key is used to access data in a database. A particular type of key known as a primary key is a key that is unique in the database. Primary keys are generally generated for each entry in a database, allowing the entry to be uniquely identified from all other entries. One way to generate primary keys is to allow user applications to generate their own keys. The problem with this approach is that different applications may generate duplicate keys, violating the desire that many primary keys should be globally unique. Multiple applications could generate their own keys if there were synchronization between the applications that would assure that both could not allocate the same key.

When computer system are networked together, the job of generating globally unique primary keys becomes more complicated. One prior art solution that assures global uniqueness of primary keys provides a central server that provides all keys to all applications on the network. By providing a single point for key generation, the uniqueness of primary keys is assured. However, this benefit comes at costs that may become significant or even prohibitive. First, a prime problem with having a single point for generating primary keys on the network is that it provides a single point of failure. If the key generator fails, if the key generator is taken down, or if network communication with the key generator is lost, all applications that depend on the key generator are not able to continue. Thus, a seemingly small problem may result in a huge shutdown of network applications and resources. Second, as the number of clients grows, the ability of the single key generator to keep up with the number of requests fails. At some point, the generation of keys becomes a bottleneck to performance. Third, each request by a client application requires network communication with the key generator, thereby creating significant bus traffic for sending keys between the global key generator and the client applications. Without an apparatus and method for generating keys without the drawbacks discussed above, the computer industry will continue to suffer from inefficient mechanisms and methods for generating globally unique keys in a network computer environment.

DISCLOSURE OF INVENTION

According to the preferred embodiments, a global key control mechanism provides a single point of overall control for key generation, but portions of the key generation and/or allocation tasks may be delegated to client computer systems, thereby reducing network traffic. The global key control mechanism may download a client key generation mechanism on one or more client computer systems, and may allocate a block of keys to the client key generation mechanism. Requests for keys may then be routed to the client key generation mechanism, which can generate and/or allocate keys within the block of keys that the global key control mechanism allocated to it. When the block of keys is used up, the client key generation mechanism may request another block from the global key control mechanism. The preferred embodiments also include the capability of downloading a client key generation mechanism with an associated block of keys once the requests from one or more client applications exceed a predetermined threshold. In addition, the preferred embodiments include a hierarchy of key control mechanisms, with a single global key control mechanism that maintains control over one or more client key control mechanisms that may, in turn, control other client key control mechanism(s) or which may generate and/or allocate keys directly to requesting applications.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

1.0 Overview

The present invention relates to key generation, which is most commonly used when accessing a database. For those not familiar with databases and keys, this Overview section will provide background information that will help to understand the present invention.

Known Databases and Key Generation Mechanisms

There are many different types of databases known in the art. The most common is known as a relational database (RDB), which organizes data in tables that have rows that represent individual entries or records in the database, and columns that define what is stored in each entry or record.

Figure 2:
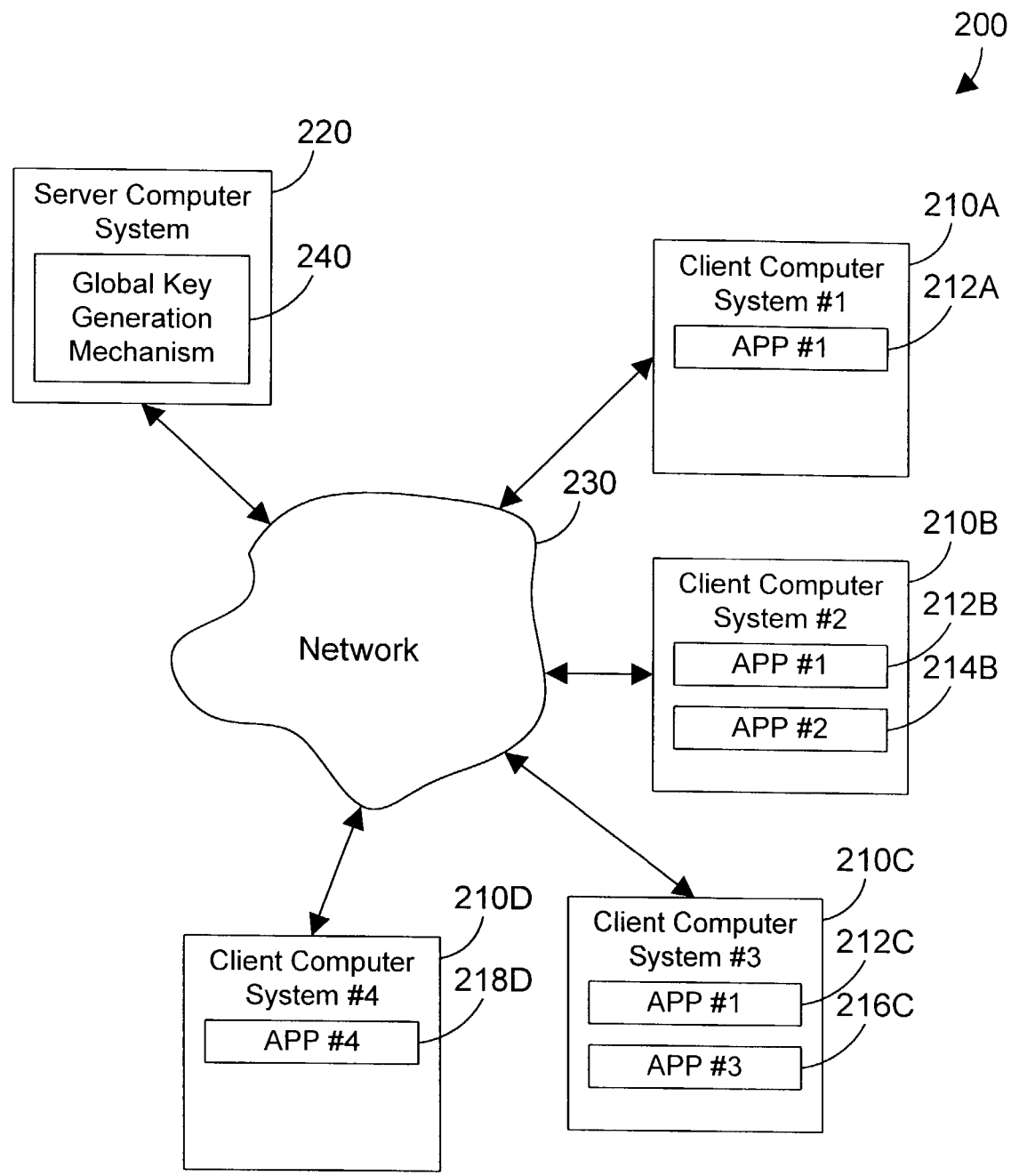
FIG. 2 is a block diagram of a sample network computer system in accordance with the teachings of the prior art.

To be useful, the data stored in databases must be able to be efficiently retrieved. One way to efficiently tag data for future retrieval is by using a globally unique primary key. Primary keys allow uniquely identifying each database entry from all other database entries. One way known in the prior art to generate globally unique primary keys is shown in FIG. 2. A network computer system 200 includes four client computer systems 210A, 210B, 210C and 210D and a server computer system 220 coupled together via a network 230. The server computer system 220 includes a global key generation mechanism 240 that is responsible for generating all keys for all four client computer systems 210A-210D.

Each client computer system may include one or more software applications that may require the generation of a globally unique key. For the purpose of illustration, client computer system 210A is shown to contain an instance 212A of a first application. Client computer system 210B is shown to contain a different instance 212B of the first application, and an instance 214B of a second application. Client computer system 210C is shown to contain a different instance 212C of the first application, and an instance 216C of a third application. Client computer system 210D is shown to contain an instance 218D of a fourth application. Computer system 200 will now be used to illustrate how the prior art uses the global key generation mechanism 240 to generate globally unique keys for each application that requires a key.

Figure 3:
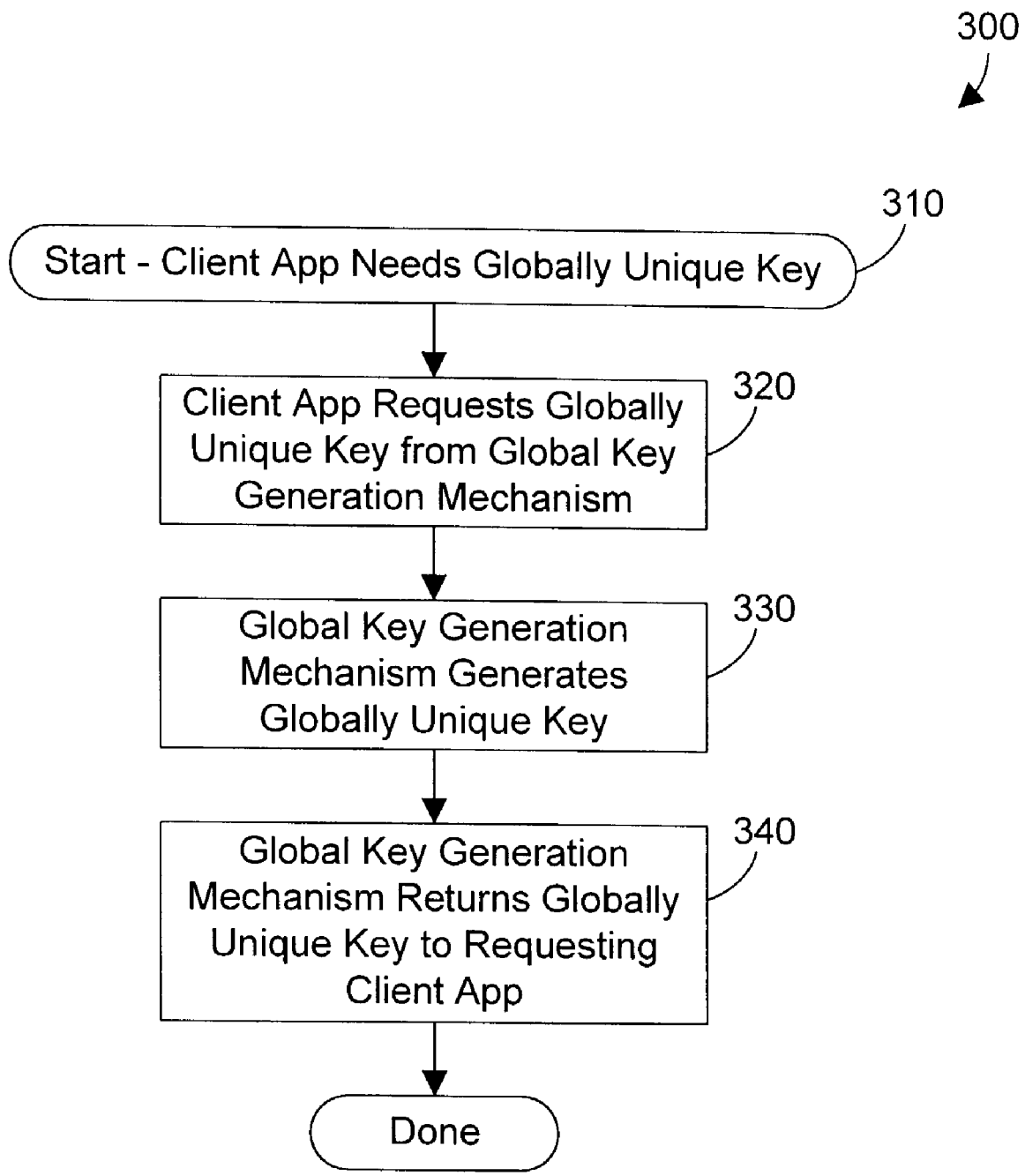
FIG. 3 is a flow diagram of a prior art method for generating a globally unique key.

Referring now to FIG. 3, a method 300 for generating a globally unique key in accordance with the prior art begins when a client application needs a globally unique key (step 310). For the specific example in FIG. 2, we assume that the instance 212B of the first application needs a globally unique key. The client application 212B requests a globally unique key from the global key generation mechanism 240 in server computer system 220 via network 230 (step 320). In response, the global key generation mechanism 240 generates a globally unique key (step 330) using any suitable key generation algorithm. Once the key is generated, the global key generation mechanism 240 returns the generated key to the requesting client application 212B (step 340). The client application 212B may then use the key.

For computer system 200, each and every request for a key from all client applications 212A, 212B, 214B, 212C, 216C, and 218D must be directed to the global key generation mechanism 240. For small computer networks running a relatively small number of client applications, prior art method 300 works reasonably well. However, the time required to generate a key goes up as the complexity of the algorithm for generating the key increases. In addition, for a large number of client applications, the sheer volume of requests for keys may result in the global key mechanism 240 becoming a bottleneck to system performance. Furthermore, the global key generation mechanism 240 provides a single point of failure in computer system 200, which means that if the global key generator mechanism 240 ever crashes, if some other application causes server computer system 220 to crash, or if network communications with server computer system 220 fails, none of the client applications 212A, 212B, 214B, 212C, 216C, and 218D can continue because they cannot proceed without keys. These disadvantages of prior art system 200 and method 300 are overcome by the present invention, the preferred embodiments of which are described below.

2.0 Detailed Description

The preferred embodiments provide a way to maintain central control over key generation without requiring that a single mechanism perform all of the key generation. In the preferred embodiments a global key control mechanism controls the generation of keys, yet it can delegate the task of key generation and/or allocation to client key generation mechanisms that may be downloaded and run on client computer systems. Of course, client applications that are local to a client key generation mechanism may now obtain a key without communicating with a global key generation mechanism over a network. As a result, network traffic involved in key generation is significantly reduced when compared to the prior art systems.

Figure 1:
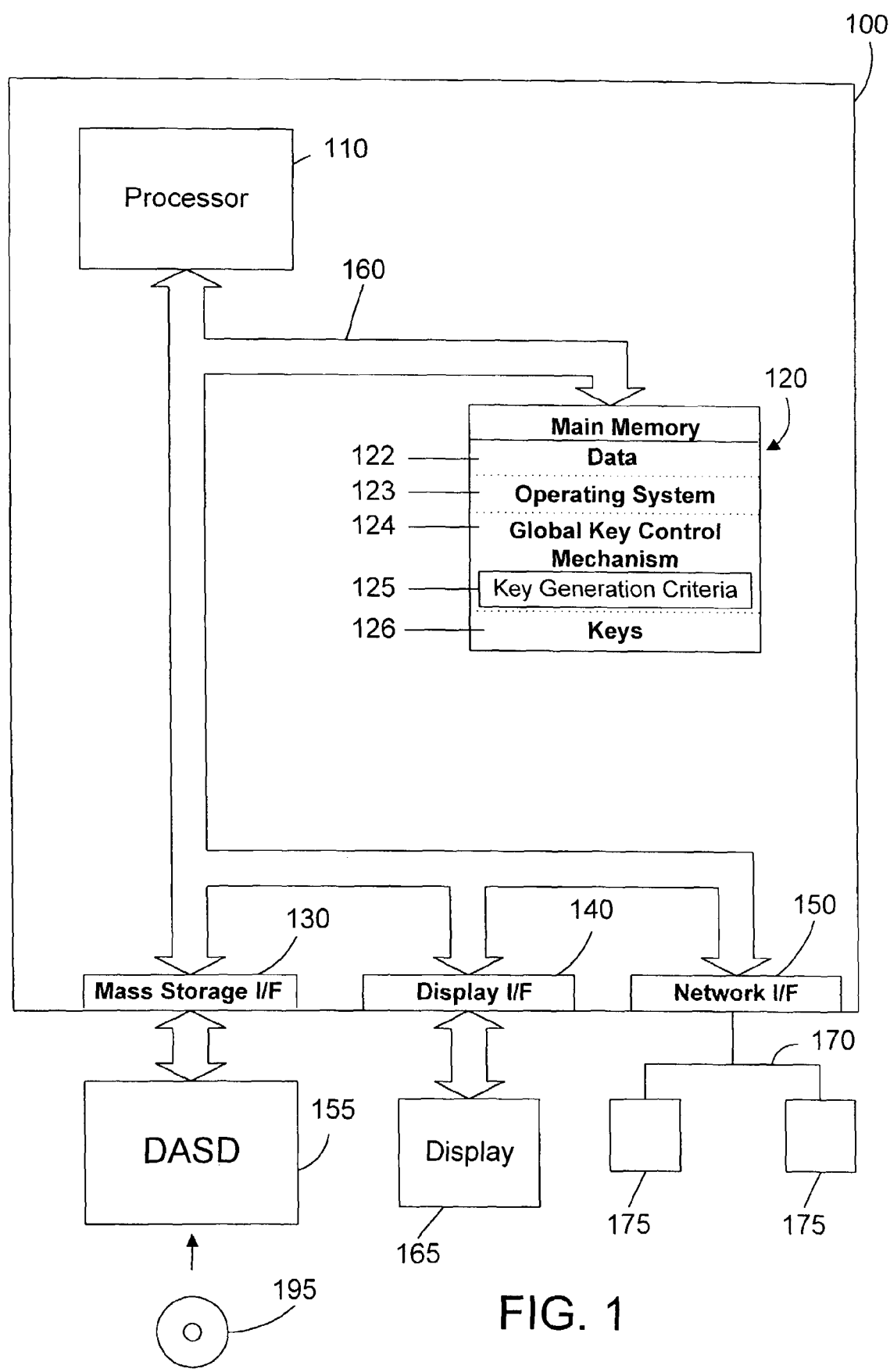
FIG. 1 is a block diagram of an apparatus in accordance with the preferred embodiments.

Referring now to FIG. 1, a computer system 100 is one suitable implementation of an apparatus in accordance with the preferred embodiments of the invention. Computer system 100 is an IBM iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices (such as a direct access storage device 155) to computer system 100. One specific type of direct access storage device 155 is a readable and writable CD RW drive, which may store data to and read data from a CD RW 195.

Main memory 120 in accordance with the preferred embodiments contains data 122, an operating system 123, a global key control mechanism 124, and keys 126 that are generated by the global key control mechanism 124. Data 122 represents any data that serves as input to or output from any program in computer system 100. Operating system 123 is a multitasking operating system known in the industry as OS/400; however, those skilled in the art will appreciate that the spirit and scope of the present invention is not limited to any one operating system. The global key control mechanism 124 preferably includes one or more key generation criteria 125 that determines how keys are generated. The key generation criteria 125 may be any suitable criteria for generating globally unique keys, from a simple incrementing integer key to a very complex scheme that involves different combinations of data or processed data, including timestamps, network interface addresses, etc. The term "key generation criteria" is used herein to include any and all suitable algorithms and methods for generating a globally unique key, whether now known or developed in the future. Note that global key control mechanism 124 uses key generation criteria 125 to generate keys 126. Once a key 126 is generated, it may be returned to a client application that requested a key.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 122, operating system 123, global key control mechanism 124, and keys 126 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 123. Operating system 123 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks and CD RW (e.g., 195 of FIG. 1), and transmission type media such as digital and analog communications links.

Figure 4:
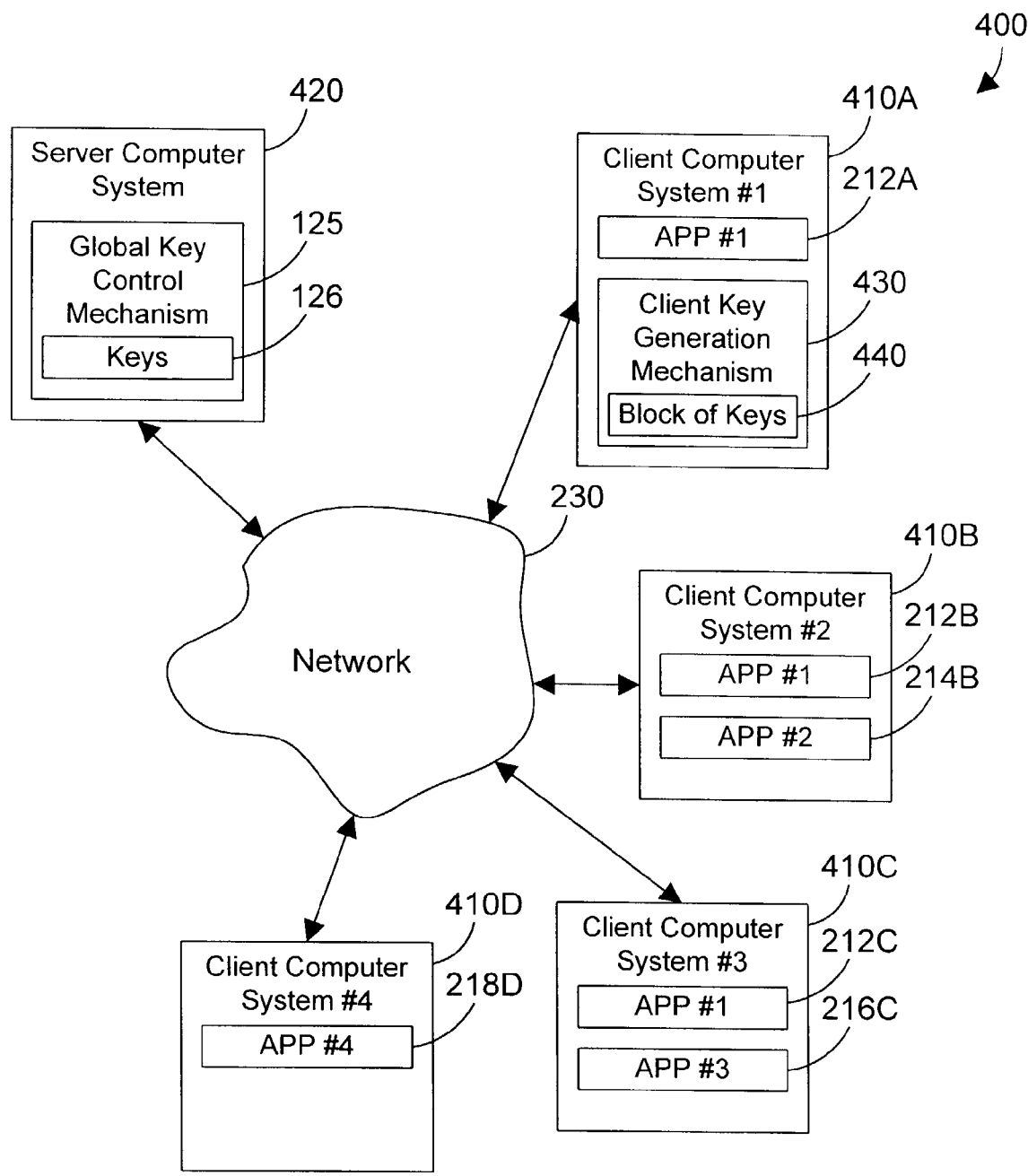
FIG. 4 is a block diagram of a networked computer system in accordance with the preferred embodiments.

Referring to FIG. 4, a networked computer system 400 in accordance with the preferred embodiments includes a server computer system 420 that executes the global key control mechanism 125 (shown in FIG. 1) to generate a plurality of globally unique keys 126. Four client computer systems 410A, 410B, 410C and 410D are coupled to the server computer system 420 and to each other via network 230. A significant difference between the global key control mechanism 125 and the global key generation mechanism 240 in the prior art system 200 shown in FIG. 2 is that the global key control mechanism 125 of the preferred embodiments provides overall control of key generation, but does not necessarily generate and allocate all keys itself. The global key control mechanism 125 may delegate some of its tasks of allocating and/or generating globally unique keys to a client key generation mechanism 430, such as that shown in client computer system 410A in FIG. 4. The global key control mechanism 125 most preferably includes the code for the client key generation mechanism 430, which may be downloaded to any suitable computer system coupled to the network 230. The client key generation mechanism 430 operates on a block of keys 440 that are defined by the global key control mechanism 125, but are reserved for use by the client key generation mechanism 430. As a result, when an application requests a key, the client key generation mechanism 430 may satisfy that request instead of accessing the global key control mechanism 125. Thus, when application instance 212A needs a key, the request may be routed to the client key generation mechanism 430 on the same computer system, which eliminates the network traffic that would normally be required in the prior art to allocate a globally unique key to an application. In addition, the client key generation mechanism 430 may service other applications in other computer systems as well. This may be useful, for example, with wide area networks that have a group of computer systems at one location that is remote to the computer system running the global key control mechanism 125. Thus, for the system shown in FIG. 4, if we assume that the client computer systems 410A-410D are all in one location that is remote from the location of the server computer system 420, the client key generation mechanism 430 may be configured to handle all requests for keys from all of the applications running on client computer systems 410A-410D. In this manner, system performance may be enhanced by allowing for local generation and/or allocation of keys, while still maintaining central control of key generation and allocation by the global key control mechanism 125.

Figure 5:
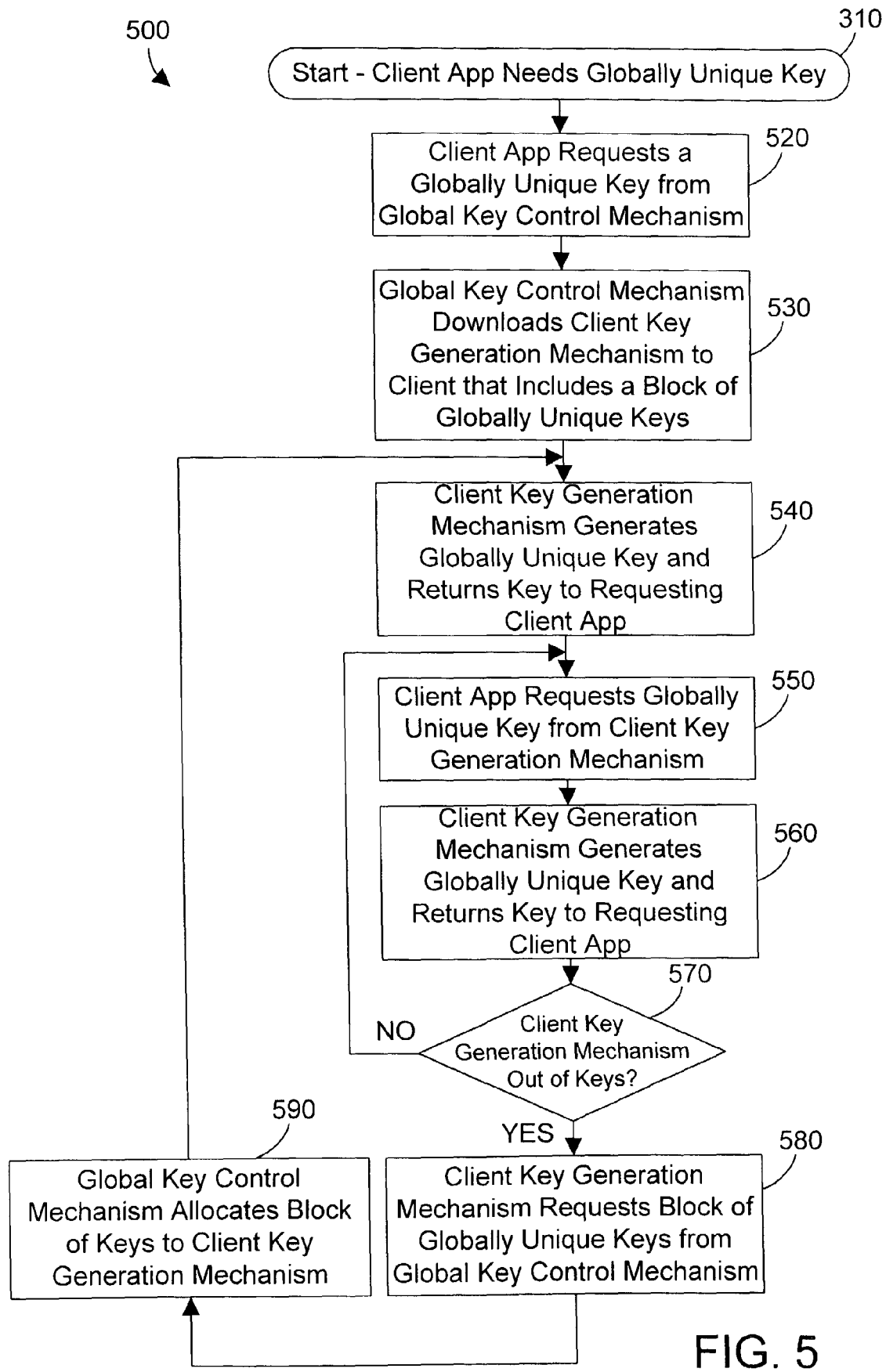
FIG. 5 is a flow diagram of a first method for generating globally unique keys within the scope of the preferred embodiments.

One suitable method 500 in accordance with the preferred embodiments is shown in FIG. 5. Method 500 starts when a client application needs a globally unique key (step 310). The client application requests a globally unique key from the global key control mechanism (step 520). In response, the global key control mechanism downloads a client key generation mechanism to the client that includes a block of globally unique keys or range of keys into which will fit the globally unique keys generated by the client key generation mechanism (step 530). The client key generation mechanism then generates or allocates a globally unique key from the keys in its allocated block and returns the globally unique key to the requesting client application (step 540). The next time a client application requests a globally unique key, the request will be routed to the client key generation mechanism (step 550). The client key generation mechanism then generates a globally unique key from the keys in its allocated block and returns the globally unique key to the requesting client application (step 560). If the client key generation mechanism still has keys in its block (step 570=NO), control passes to step 550 for the next request for a globally unique key from a client application. Once the client key generation mechanism is out of keys in its allocated block (step 570=YES), the client key generation mechanism requests a new block of globally unique keys from the global key control mechanism (step 580). In response, the global key control mechanism allocates a new block of keys to the client key generation mechanism (step 590), and control passes to step 540 for the next request for a globally unique key from a client application.

While step 530 shows the downloading of a client key generation mechanism in response to a request for a globally unique key, this step 530 need not necessarily be performed when a key is requested from the global key control mechanism. The global key control mechanism may itself generate a globally unique key. Thus, the global key control mechanism may perform prior art method 300 in FIG. 3 in some circumstances.

Global key control mechanism includes the intelligence to know when to generate and allocate a key directly, and when to offload some of the work in key generation and/or allocation to a different computer system.

Figure 6:
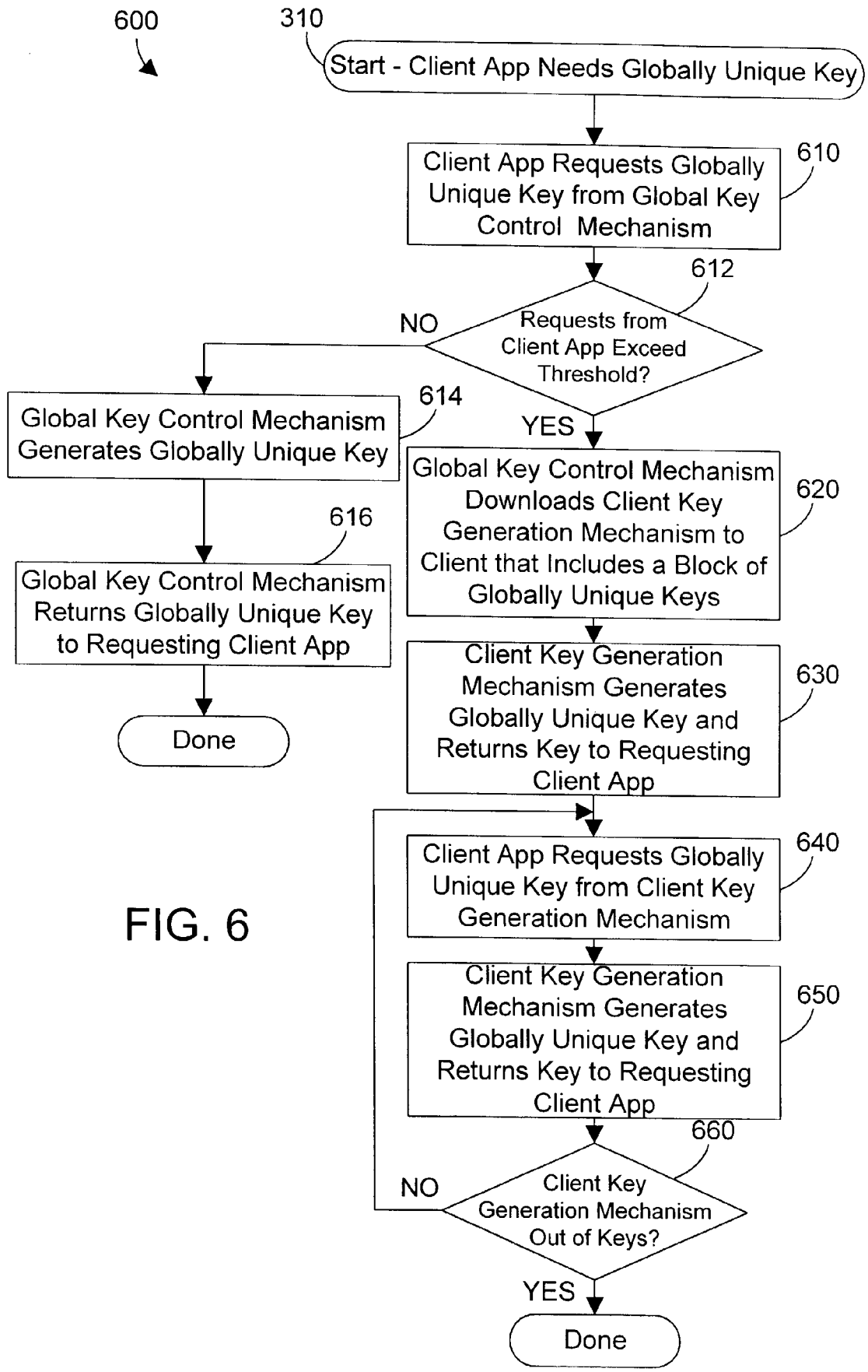
FIG. 6 is a flow diagram of a second method for generating globally unique keys within the scope of the preferred embodiments.

Another method 600 is shown in FIG. 6 to show one specific example of the global key generation mechanism using internal intelligence to determine when to offload some of the work in generating and/or allocating globally unique keys. Method 600 begins when a client application needs a globally unique key (step 310). The client application requests a globally unique key from the global key control mechanism (step 610). The global key control mechanism then determines whether to directly generate and allocate a key to the requesting application, or whether to offload the task of generating keys for the requesting allocation to a different computer system. For the specific example in FIG. 6, we assume that the global key mechanism uses a predetermined threshold rate of key requests to determine whether to directly service the request or whether to offload the request. For example, if the requesting application only requests a single key every ten minutes on average, the global key control mechanism may decide to generate and allocate the globally unique key directly. However, if the requesting application is requesting a key every second on average, it would be helpful to offload the key generation and/or allocation to a different computer system. The global key control mechanism tracks requests from all client applications, and if the rate of requests do not exceed the predetermined threshold (step 612=NO), the global key control mechanism generates the globally unique key (step 614) and returns the key to the requesting client application (step 616). If the rate of requests from this client application exceed the predetermined threshold (step 612=YES), it would be helpful to offload some of the work in generating and/or allocating keys to a different computer system, so the global key control mechanism downloads a client key generation mechanism and a block of associated globally unique keys or range of keys into which will fit the globally unique keys generated by the client key generation mechanism to a client computer system (step 620). The client key generation mechanism then generates a globally unique key within the block of keys allocated to it by the global key control mechanism and returns the generated key to the requesting client application (step 630). The next time the client application requests a globally unique key, the request will be routed to the client key generation mechanism (step 640), which generates a globally unique key and returns the generated key to the requesting client application (step 650). Note that steps 640 and 650 require no interaction with the global key control mechanism, so network traffic is reduced, and the performance of the system is enhanced due to the local handling of key requests. As long as the client key generation mechanism has keys in its block received from the global key control mechanism (step 660=NO), it can continue to handle the generation of keys locally from its allocated block (steps 640 and 650). Once the client key generation mechanism runs out of keys (step 660=YES), method 600 is done. Note that method 600 may be re-started the next time a client application needs a globally unique key (step 310).

Note that the predetermined threshold referenced in step 612 may include any suitable heuristic for determining whether or not to offload some of the work in generating and/or allocating keys to a different computer system. For example, the predetermined threshold may vary according to the processing load on the computer system that runs the global key control mechanism. The predetermined threshold could also include a network performance value, such as the time for a client computer system to respond to a "ping" command. The preferred embodiments extend to any and all heuristics and methods for deciding when to generate and allocate a globally unique key and when to offload the work for generating and/or allocating one or more globally unique keys to a different computer system.

Figure 7:
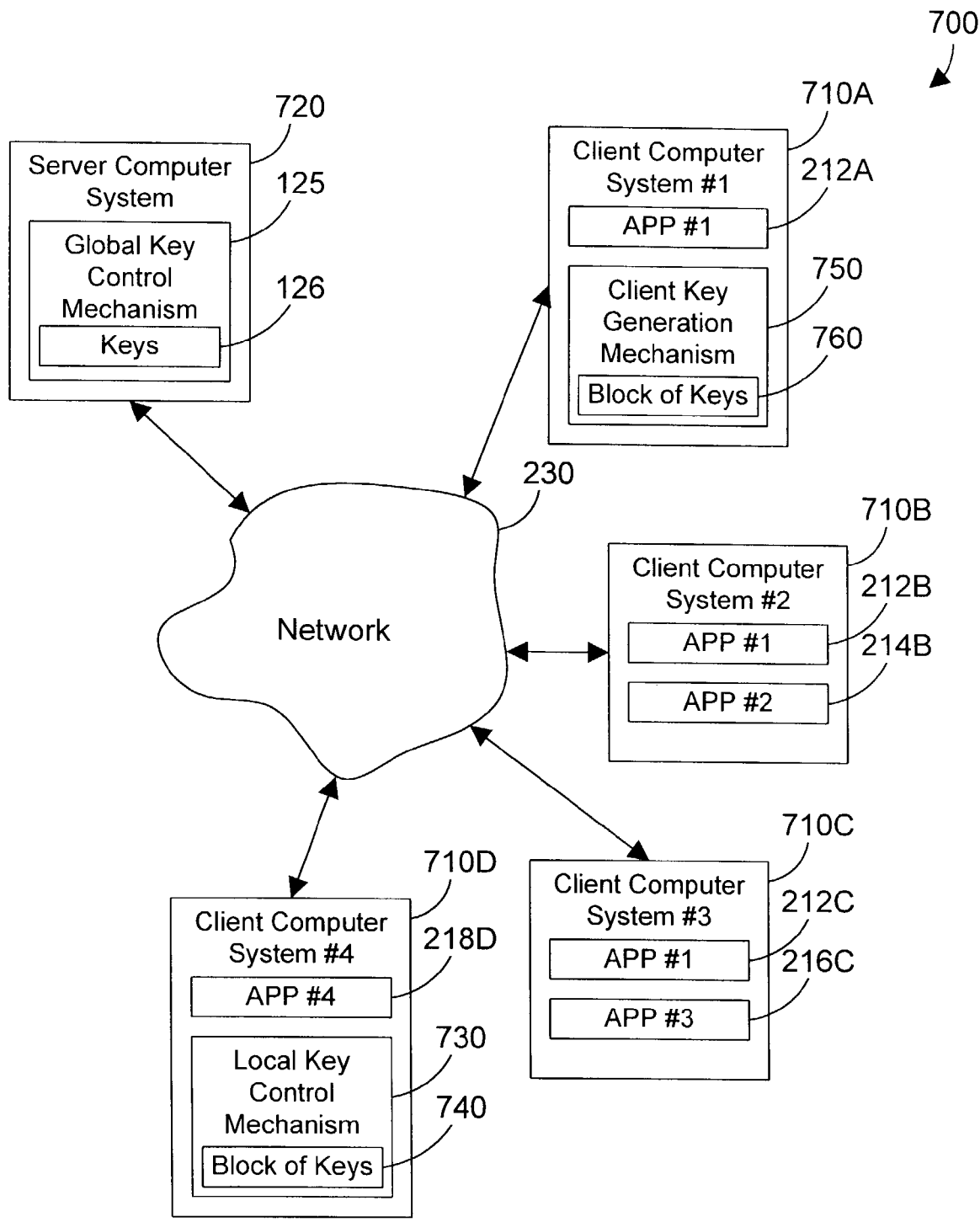
FIG. 7 is a block diagram showing one suitable example of a hierarchy of key control mechanisms within the scope of the preferred embodiments.

The preferred embodiments also include the ability to create a hierarchy of key controllers that all function under the control and supervision of a single global key control mechanism. For example, FIG. 7 shows one networked computer system 700 that includes a server computer system 720 that runs a global key control mechanism 125 that generates a plurality of globally unique keys 126. Four client computer systems 710A, 710B, 710C and 710D are coupled to the server computer system 720 via a network 230. Client computer system 710A includes a client key generation mechanism 750 with an allocated block of keys 760. Client computer system 710D includes a local key control mechanism 730 that also includes an allocated block of keys 740. This system 700 shows how a hierarchy of key control and generation mechanisms may be set up. We assume that local key control mechanism 730 and its block of keys 740 are downloaded by the global key control mechanism 125. This means that the block of keys 740 is a subset of keys 126. We assume that the local key control mechanism 730 may now perform the functions of the global key control mechanism with respect to the other client computer systems 710A, 710B, and 710C that we assume are in a location that is relatively close to the client computer system 710D. Thus, when needed, the local key control mechanism may download the client key generation mechanism 750 to client computer system 710A, and may allocate from its block of keys 740 the block of keys 760. This means that block of keys 760 is a subset of block of keys 740. This type of hierarchy can be extended as required. One skilled in the art will appreciate from the simple example in FIG. 7 that the preferred embodiments may be scaled to any size and configuration of computer network. A significant advantage of the preferred embodiments is the ability to maintain central control of key generation without the burden of central generation and/or allocation of keys.

Two examples are now presented to illustrate the detailed operation of the preferred embodiments. We assume for this example that integer keys are generated, beginning with one and incrementing one for each new key. For system 400 in FIG. 4, we assume that application instance 216C in client computer system 410C requests a key from global key control mechanism 125. In response, the global key control mechanism 125 returns the integer key with a value of 1. Next, we assume that application instance 212B in client computer system 410B requests a key from global key control mechanism 125. In response, the global key control mechanism 125 returns the integer key with a value of 2. Next, we assume that application instance 218D in client computer system 410D requests a key from global key control mechanism 125. In response, the global key control mechanism 125 returns the integer key with a value of 3. Next, we assume that application instance 212A requests a key from global key control mechanism 125. In response, we assume that global key control mechanism 125 downloads the client key generation mechanism 430 to client computer system 410A, and allocates a block 440 of 100 integer keys that have values of 4 through 103 to the client key generation mechanism 430. The first key in the block (with a value of 4) is then allocated to the application instance 212A.

When the client key generation mechanism 430 receives subsequent requests for a key from application instance 212A, it allocates the next key in its block 440, which has a value of 5. The next time the global key and control mechanism 125 receives a request for a key or block of keys, it begins with the key with a value of 104, because keys 4-103 have been allocated as a block 440 to the client key generation mechanism 430. The global key control mechanism 125 and client key generation mechanism 430 may now operate independently from each other so long as there remain keys in the block of keys 440 that client key generation mechanism 430 can allocate to application instance 212A. Thus, both can continue processing for their respective clients, handing out keys which are going to be unique without further communication. When the client key generation mechanism 430 hands out the key with a value of 103, it recognizes that all keys in its allocated block 440 have been used, so it can no longer act on its own. The client key generation mechanism 430 may then request another block of keys from global key control mechanism 125. Let's assume that during the time that the client key generation mechanism 430 was handing out its block of 100 keys, the global key control mechanism 125 handed out keys or blocks of keys with values 104-328. Assuming the client key generation mechanism 430 next requests a new block of 100 keys, the global key control mechanism 125 would allocate a new block of keys with values 329-428 to the client key generation mechanism 430. Once the client key generation mechanism 430 receives this new block 440 of keys, both the client key generation mechanism 430 and the global key control mechanism 125 may continue independently handing out keys.

Note that the global key control mechanism 125 maintains control over the size of the block of keys it allocates to client key generation mechanism 430. Thus, if a client key generation mechanism 430 requests a block of 1,000,000 keys, the global key control mechanism 125 may decide that this number of keys is excessive, and may instead allocate a block of 100 keys. In this way, a request from a client key generation mechanism 430 is just that, a request. The global key control mechanism 125 maintains control over key generation, even though some of the work in allocating or generating keys has been offloaded to one or more client key generation mechanisms.

A second example is now presented to illustrate the detailed operation of system 700 in FIG. 7. We assume for this example that integer keys are generated, beginning with one and incrementing one for each new key (like the previous example). We assume that application instance 216C in client computer system 710C requests a key from global key control mechanism 125. In response, the global key control mechanism 125 returns the integer key with a value of 1. Next, we assume that application instance 212B in client computer system 710B requests a key from global key control mechanism 125. In response, the global key control mechanism 125 returns the integer key with a value of 2. Next, we assume that application instance 218D in client computer system 710D requests a key from global key control mechanism 125. In response, we assume the global key control mechanism 125 decides to download a local key control mechanism 730 that will act as a key controller for all client computer systems 710A, 710B, 710C and 710D. We assume that global key control mechanism allocates a block of 1000 keys (740) to the local key control mechanism 730, which have values 3-1002. We assume that the first key with a value of 3 is allocated to application instance 218D. Next, we assume that application instance 212A needs a block of 100 keys. A request is made to local key control mechanism 730 for 100 keys. In response, the local key control mechanism 730 downloads the client key generation mechanism 750 to client computer system 710A, and allocates a block of integer keys 760 that have values of 4 through 103 to the client key generation mechanism 430. The first key in the block (with a value of 4) is then allocated to the application instance 212A.

When the client key generation mechanism 750 receives subsequent requests for a key from application instance 212A, it allocates the next key in its block 440, which has a value of 5. At the same time, the local key control mechanism 730 may continue to hand out keys from its block 740 to requesting application instances. Thus, we see in this scenario that the client key generation mechanism 750, the local key control mechanism 730, and the global key control mechanism 125 may operate independently from each other so long as client key generation mechanism 750 and local key control mechanism 730 have more keys to hand out. Thus, all three can continue processing for their respective clients, handing out keys which are going to be unique without further communication. When the client key generation mechanism 750 hands out the key with a value of 103, it recognizes that all keys in its allocated block 760 have been used, so it can no longer act on its own. The client key generation mechanism 750 may then request another block of keys from local key control mechanism 730. Let's assume that during the time that the client key generation mechanism 750 was handing out its block of 100 keys, the local key control mechanism 730 handed out keys with values 104-328. Assuming the client key generation mechanism 750 next requests a new block of 100 keys, the local key control mechanism 730 would allocate a new block of keys with values 329-428 to the client key generation mechanism 750. Once the client key generation mechanism 750 receives this new block 760 of keys, the client key generation mechanism 750, the local key control mechanism 730, and the global key control mechanism 125 may continue independently handing out keys. Once the local key control mechanism 730 has no more keys in its block of keys 740, it can request a new block of keys from global key control mechanism 125. In this manner, global control of key generation is maintained while offloading significant overhead in the generation and/or allocation of keys in a networked computing environment.

Note that the preferred embodiments include offloading the work of allocating keys, generating keys, or both. For example, in the simple integer examples given above, the global key control mechanism 125 assumes the trivial task of generating the integer keys, and may allocate the generated keys to one or more local key control mechanisms and/or to one or more client key generation mechanisms. The local key control mechanism(s) and client key generation mechanism (s) are referred to generally herein as sub-agents. In the simple examples given above, the sub-agents are responsible for merely allocating the keys that were allocated to them. No generation of keys is required by the sub-agents. However, the preferred embodiments also extend to any suitable method for allocating or generating keys. For example, the global key control mechanism 125 may allocate a block of keys to a sub-agent without actually generating those keys. The keys may then be generated by the sub-agents. In this case, the global key control mechanism must generate its keys using any suitable key generation criteria, but the sub-agents must use the same key generation criteria to generate their keys so they will lie within the range of keys allocated to them. The preferred embodiments expressly extend to the allocation of keys generated elsewhere, to the generation of keys, or both.

The preferred embodiments provide a significant enhancement over the prior art by providing central control of key generation/allocation without the overhead or problems associated with the prior art system of having a single global key generation mechanism generate and allocate all keys. The system of the preferred embodiments may be dynamically changed or scaled as needed. The present invention thus provides a very flexible and powerful way to globally control the generation of globally unique keys in a networked computer system.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. A networked computer system comprising:
   a first computer system; and
   a second computer system coupled via a network to the first computer system, wherein the second computer system includes a global key control mechanism, the global key control mechanism allocating and downloading a first block of globally unique keys to a client key generation mechanism executing on the first computer system, the client key generation mechanism allocating a plurality of globally unique keys from the first block to at least one application that requests a key.

2. The networked computer system of claim 1 wherein the global key control mechanism generates a plurality of globally unique keys according to at least one global key criterion.

3. The networked computer system of claim 2 wherein the client key generation mechanism executing on the first computer system generates a plurality of globally unique keys within the first block of globally unique keys according to the at least one global key criterion.

4. The networked computer system of claim 1 wherein the global key control mechanism executing on the second computer system downloads the client key generation mechanism to the first computer system.

5. The networked computer system of claim 1 wherein the client key generation mechanism requests a second block of keys from the global key control mechanism when a predetermined number of the first block of keys has been allocated by the client key generation mechanism.

6. The networked computer system of claim 1 wherein the at least one application that requests a key is executing on the first computer system.

7. A networked computer system comprising:
   (A) a first computer system; and
   (B) a second computer system coupled via a network to the first computer system, wherein the second computer system includes a global key control mechanism that generates a plurality of globally unique keys and determines when to share some of the work load of allocating globally unique keys, and when the global key control mechanism determines to share some of the work load of allocating globally unique keys, the global key control mechanism performs the steps of:
       (B1) downloading a client key allocation mechanism to the first computer system; and
       (B2) allocating and downloading a first block of globally unique keys to the client key allocation mechanism;
   (C) wherein the client key allocation mechanism allocates a plurality of globally unique keys to at least one application that requests a key.

8. The networked computer system of claim 7 wherein the client key allocation mechanism requests a second block of keys from the global key control mechanism when a predetermined number of the first block of keys has been allocated by the client key allocation mechanism to the at least one application.

9. A networked computer system comprising:
   (A) a first computer system; and
   (B) a second computer system coupled via a network to the first computer system, wherein the second computer system includes a global key control mechanism that generates a plurality of globally unique keys and determines when to share some of the work load of generating globally unique keys, and when the global key control mechanism determines to share some of the work load of generating globally unique keys, the global key control mechanism performs the steps of:
       (B1) downloading a client key generation mechanism to the first computer system; and
       (B2) allocating a first block of globally unique keys to the client key generation mechanism;
   (C) wherein the client key generation mechanism generates a plurality of keys in the first block and allocates the plurality of keys to at least one application that requests a key.

10. The networked computer system of claim 9 wherein the client key generation mechanism requests a second block of keys from the global key control mechanism when a predetermined number of the first block of keys has been generated and allocated by the client key generation mechanism to the at least one application.

11. A computer-implemented method for generating and allocating globally unique keys in a network computing environment, the method comprising the steps of:
    (A) executing a global key control mechanism on a first computer system, the global key control mechanism generating a plurality of globally unique keys; and
    (B) allocating and downloading a first block of the plurality of globally unique keys to a client key allocation mechanism executing on a second computer system coupled via network to the first computer system, the client key allocation mechanism allocating a plurality of globally unique keys in the first block to at least one application that requests a key.

12. The method of claim 11 wherein the global key control mechanism generates the plurality of globally unique keys according to at least one global key criterion.

13. The method of claim 12 further comprising the step of the client key generation mechanism generating a plurality of globally unique keys within the first block of keys according to the at least one global key criterion.

14. The method of claim 11 further comprising the steps of:
    the global key control mechanism downloading the client key generation mechanism to the first computer system; and executing the client key generation mechanism on the first computer system.

15. The method of claim 11 further comprising the step of the client key generation mechanism requesting a second block of keys from the global key control mechanism when a predetermined number of the first block of keys has been allocated by the client key generation mechanism to the at least one application.

16. A computer-implemented method for generating and allocating globally unique keys in a networked computing environment, the method comprising the steps of:
   (A) generating a plurality of globally unique keys on a first computer system;
   (B) determining when to share some of the work load of allocating globally unique keys;
   (C) when the determination is made to share some of the work load of allocating globally unique keys, the global key control mechanism performing the steps of:
      (C1) downloading a client key allocation mechanism to a second computer system; and
      (C2) allocating and downloading a first block of globally unique keys to the client key allocation mechanism;
   (D) the client key allocation mechanism allocating a plurality of keys in the first block to at least one application that requests a key.

17. The method of claim 16 further comprising the step of the client key allocation mechanism requesting a second block of keys from the global key control mechanism when a predetermined number of the first block of keys has been allocated by the client key allocation mechanism to the at least one application.

18. A computer-implemented method for generating and allocating globally unique keys in a networked computing environment, the method comprising the steps of:
   (A) generating a plurality of globally unique keys on a first computer system;
   (B) determining when to share some of the work load of generating globally unique keys;
   (C) when the determination is made to share some of the work load of generating globally unique keys, performing the steps of:
      (C1) downloading a client key generation mechanism to a second computer system; and
      (C2) allocating a first block of globally unique keys to the client key generation mechanism;
   (D) the client key generation mechanism generating a plurality of keys in the first block and allocating the plurality of keys to at least one application that requests a key.

19. The method of claim 18 further comprising the step of the client key generation mechanism requesting a second block of keys from the global key control mechanism when a predetermined number of the first block of keys has been generated and allocated by the client key generation mechanism to the at least one application.

20. A computer-readable program product comprising:
   (A) a global key control mechanism that generates a plurality of globally unique keys and determines when to share some of the work load of allocating globally unique keys, and when the global key control mechanism determines to share some of the work load of allocating globally unique keys, the global key control mechanism performs the steps of:
      (A1) downloading a client key allocation mechanism to the first computer system; and
      (A2) allocating and downloading a first block of globally unique keys to the client key allocation mechanism;
   wherein the client key allocation mechanism allocates a plurality of keys in the first block to at least one application that requests a key; and
   (B) recordable media bearing the global key control mechanism and the client key generation mechanism.

21. The program product of claim 20 wherein the client key allocation mechanism requests a second block of keys from the global key control mechanism when a predetermined number of the first block of keys has been allocated by the client key allocation mechanism to the at least one application.

22. A computer-readable program product comprising:
   (A) a global key control mechanism that generates a plurality of globally unique keys and determines when to share some of the work load of allocating globally unique keys, and when the global key control mechanism determines to share some of the work load of generating globally unique keys, the global key control mechanism performs the steps of:
      (A1) downloading a client key generation mechanism to the first computer system; and
      (A2) allocating a first block of globally unique keys to the client key generation mechanism;
   wherein the client key generation mechanism generates a plurality of keys in the first block to at least one application that requests a key; and
   (B) recordable media bearing the global key control mechanism and the client key generation mechanism.

23. The program product of claim 22 wherein the client key generation mechanism requests a second block of keys from the global key control mechanism when a predetermined number of the first block of keys has been generated and allocated by the client key generation mechanism to the at least one application.

* * * * *